US012753118B2

(12) United States Patent
Hou et al.

(10) Patent No.: US 12,753,118 B2
(45) Date of Patent: Oct. 6, 2026

(54) DUAL-SCALE TOUGHENED CEMENT-BASED COMPOSITE MATERIAL AND USE THEREOF

(71) Applicant: QINGDAO UNIVERSITY OF TECHNOLOGY, Qingdao (CN)

(72) Inventors: Dongshuai Hou, Qingdao (CN); Bing Yin, Qingdao (CN); Xianle Hua, Qingdao (CN); Huafeng Xu, Qingdao (CN); Fangyu Fan, Qingdao (CN); Kailu Han, Qingdao (CN); Pan Wang, Qingdao (CN); Xinpeng Wang, Qingdao (CN); Zuquan Jin, Qingdao (CN)

(73) Assignee: Qingdao University of Technology, Qingdao (CN)

( * ) Notice: Subject to any disclaimer, the term of this patent is extended or adjusted under 35 U.S.C. 154(b) by 588 days.

(21) Appl. No.: 18/274,388

(22) PCT Filed: Apr. 2, 2022

(86) PCT No.: PCT/CN2022/084951
§ 371 (c)(1),
(2) Date: Jul. 26, 2023

(87) PCT Pub. No.: WO2023/164987
PCT Pub. Date: Sep. 7, 2023

(65) Prior Publication Data

US 2025/0011235 A1 Jan. 9, 2025

(30) Foreign Application Priority Data

Mar. 2, 2022 (CN) ......................... 202210206579.1

(51) Int. Cl.
*C04B 24/26* (2006.01)
*C04B 16/06* (2006.01)
(Continued)

(52) U.S. Cl.
CPC ...... *C04B 24/2652* (2013.01); *C04B 16/0641* (2013.01); *C04B 22/12* (2013.01);
(Continued)

(58) Field of Classification Search
CPC . C04B 24/2652; C04B 16/0641; C04B 28/04; C04B 28/02; C04B 24/287;
(Continued)

(56) References Cited

FOREIGN PATENT DOCUMENTS

CN 104609759 A 5/2015
CN 105585294 A * 5/2016
(Continued)

OTHER PUBLICATIONS

English Machine Translation of CN111363077 (A) obtained on Feb. 13, 2026 from Espacenet—results view (Year: 2020).*
(Continued)

*Primary Examiner* — Joseph S Del Sole
*Assistant Examiner* — Olga Lucia Donahue
(74) *Attorney, Agent, or Firm* — Reising Ethington P.C.

(57) ABSTRACT

Disclosed are a dual-scale toughened cement-based composite material and use thereof. The cement-based composite material includes a cementitious material, a polymer monomer, an initiator, a crosslinking agent, and fibers, wherein functional groups of the polymer monomer include a carbon-carbon double bond and a carboxyl group; and the fibers include steel fibers and/or synthetic fibers, the synthetic fibers including one or more selected from the group consisting of polyvinyl alcohol fibers, polypropylene fibers, glass fibers, and carbon fibers.

17 Claims, 3 Drawing Sheets

(51) Int. Cl.

| | |
|---|---|
| ***C04B 22/12*** | (2006.01) |
| ***C04B 22/14*** | (2006.01) |
| ***C04B 24/16*** | (2006.01) |
| ***C04B 28/04*** | (2006.01) |
| ***C04B 40/00*** | (2006.01) |
| *C04B 103/00* | (2006.01) |

(52) U.S. Cl.
CPC ............ *C04B 22/142* (2013.01); *C04B 24/16* (2013.01); *C04B 28/04* (2013.01); *C04B 40/0046* (2013.01); *C04B 2103/0046* (2013.01); *C04B 2103/0062* (2013.01)

(58) Field of Classification Search
CPC ................ C04B 14/06; C04B 20/0048; C04B 2103/0046; C04B 14/42; C04B 14/48; C04B 14/386; C04B 16/0633; C04B 18/08; C04B 18/146; C04B 24/2641
See application file for complete search history.

(56) References Cited

FOREIGN PATENT DOCUMENTS

| | | | |
|---|---|---|---|
| CN | 111363077 | A | 7/2020 |
| JP | 1993070204 | A | 3/1993 |
| JP | 1993105497 | A | 4/1993 |
| JP | 2012153554 | A | 8/2012 |
| WO | WO 2017114375 | A1 | 7/2017 |

OTHER PUBLICATIONS

English Machine Translation of CN105585294 A (A) obtained on Feb. 13, 2026 from Espacenet—results view (Year: 2016).*
Zhang, Erqin et al.; "Comprehensive Overview of Polymer Concrete"; Sichuan Building Materials; issn. 1672-4011; Mar. 18, 2014.
Sun, Gui-peng; "Development and Application of Polymer Modified Concrete"; Research and Application Building Materials; Nov. 18, 2015.
Chen, Gong-Zeng et al.; "Interfacial Bonding Properties of Fiber-Cement Based Materials"; Design and Test; 2018.
Dai, Chao; "Overview for Development of Research on Adhesive Property of Steel Fiber-Cement Matrix Interface"; Oct. 5, 2014.
Chief Editor: Qi Jinyuan Yu Wencheng; "Water Conservancy Seicheng Construction Bai Ke Encyclopedia" p. 354; original and English translation.
CNIPO; First Office Action prepared for CN 202210206579.1 dated Jul. 12, 2022.
CNIPO; Second Office Action prepared for CN 202210206579.1 dated Nov. 21, 2022.
CN/ISA; International Search Report prepared for PCT/CN2022/084951 filed Apr. 2, 2022.

* cited by examiner

DUAL-SCALE TOUGHENED CEMENT-BASED COMPOSITE MATERIAL AND USE THEREOF

The present application is a national stage application of International Patent Application No. PCT/CN2022/084951, filed on Apr. 2, 2022, which claims priority to Chinese Patent Application No. 202210206579.1, entitled "Dual-Scale Toughened Cement-Based Composite Material and Use Thereof", and filed with the China National Intellectual Property Administration on Mar. 2, 2022. The disclosure of the two applications is incorporated by references herein in their entireties as part of the present application.

TECHNICAL FIELD

The present disclosure relates to the technical field of building materials, and particularly relates to a dual-scale toughened cement-based composite material and use thereof.

BACKGROUND

Cement-based materials are the most widely used building materials, but they belong to porous heterogeneous materials, and exhibit low flexural strength and poor toughness. Polymer modification and fiber modification are two widely used methods for increasing flexural strength and toughness of cement-based materials. Reinforcing materials of different scales vary in their effects on cement-based materials, and a single scale of reinforcing material has a slight deficiency in the overall improvement in properties of cement-based materials. Therefore, in order to improve the toughness of cement-based materials, composite reinforcement with reinforcing materials of different scales is required to achieve synergistic complementary effects.

Polymers can form interlinked, interpenetrating networks with cement hydration products in concrete, which disperses and transfers stress and thus prevents or reduces crack propagation. Meanwhile, the polymers improve the interface structure and properties between the cementitious material and the aggregate, enhance the adhesion among components, and increase the strength of the transition zone, thereby significantly improving the performance of the material. In addition, due to having specific functional groups, some polymers are capable of chemically interacting with cement hydration products or metal ions to form particular bridged linkage, which makes it possible to enhance the bonding between the materials, thereby improving concrete properties. However, there is a problem of non-uniform polymer distribution for the polymer-modified concrete, and poor compatibility and bonding of the polymer with hydration products result in undesirable toughness modification effect on the polymer-modified cement-based materials (Guipeng Sun, "Development and Applications of Polymer-Modified Concrete" [J]. *Research & Application of Building Materials,* 2016 (01): 9-12+15; and Erqin Zhang and Zhiqiang Huang, "Comprehensive Overview of Polymer Concrete" [J]. *Sichuan Building Materials,* 2014, 40 (03): 39-40+43). The fibers in the fiber-modified concrete improve the concrete internal structure mainly by physical action, which can refine the microstructure of the concrete, reduce internal initial defects, and can also effectively restrict the propagation of cracks when the concrete is under load, thereby improving the brittleness of the concrete. However, generally a weakly bonded interface is formed between the fibers and the cement matrix, which causes the fibers' premature debonding from the matrix during load transfer, thereby resulting in that the fibers are pulled out of the matrix. Therefore, the toughening effect of fibers cannot be adequately exerted (Chao Dai and Weichao Liu, "Overview for Development of Research on Adhesive Property of Steel Fiber-Cement Matrix Interface" [J]. *Technology of Highway and Transport,* 2014 (05): 16-22; and Gongzeng Chen and Xurong Ma, "Interfacial Bonding Properties of Fiber-Cement Based Materials" [J]. *Road machinery & construction mechanization,* 2018, 35 (07): 75-78.).

Neither current polymer modification nor fiber modification can stably improve the toughness of cement-based materials.

SUMMARY

In view of this, it is an object of the present disclosure to provide a dual-scale toughened cement-based composite material featuring high toughness.

In order to achieve the above object of the disclosure, the present disclosure provides the following technical solutions:

Provided is a dual-scale toughened cement-based composite, comprising a cementitious material, a polymer monomer, an initiator, a crosslinking agent, and fibers;

wherein functional groups of the polymer monomer include a carbon-carbon double bond and a carboxyl group; and the fibers include steel fibers and/or synthetic fibers, the synthetic fibers including one or more selected from the group consisting of polyvinyl alcohol fibers, polypropylene fibers, glass fibers, and carbon fibers.

In some embodiments, the carboxyl group is replaced with a group that is hydrolysable into a carboxyl group.

In some embodiments, the polymer monomer includes one or more selected from the group consisting of acrylamide monomers, acrylic polymer monomers, a butyl methacrylate monomer, an ethylene dimethacrylate monomer, and a hydroxyethyl methacrylate monomer.

In some embodiments, a mass ratio of the cementitious material to the polymer monomer is in a range of 100:(0.1-10), and the fibers account for 0.5-3 vol. % of the dual-scale toughened cement-based composite material.

In some embodiments, the steel fibers each have a diameter of 300-1200 μm and a length of 20-120 mm; and the synthetic fibers each have a diameter of 5-100 μm and a length of 3-40 mm.

In some embodiments, the initiator includes one or more selected from the group consisting of persulfate, sulphite, an organic peroxide-ferrous salt system, a multi-electron transfer hypervalent compound-sulphite system, and a non-peroxide initiator; and a mass ratio of the polymer monomer to the initiator is in a range of 100:(0.5-5).

In some embodiments, the crosslinking agenter is a polyamino crosslinking agent; and a mass ratio of the polymer monomer to the crosslinking agent is in a range of 100:(0.3-5).

In some embodiments, the crosslinking agent includes one or more selected from the group consisting of N,N'-methylenebisacrylamide, hexamethylenetetramine-hydroquinone, polyethyleneimine, p-phenylenediamine, and dimethylaminoethyl methacrylate.

In some embodiments, the cementitious material includes cement.

In some embodiments, the dual-scale toughened cement-based composite material further includes an aggregate and/or an admixture.

In some embodiments, the aggregate includes sand and/or gravels.

In some embodiments, a mass ratio of the cement to the aggregate is in a range of 1:(1-3).

In some embodiments, the admixture includes silica fume and/or fly ash.

In some embodiments, a mass ratio of the admixture to the cement is not larger than 1.

In some embodiments, the persulfate salt includes one or more selected from the group consisting of ammonium persulfate, potassium persulfate, and sodium persulfate.

In some embodiments, the sulphite salt includes sodium sulphite and/or sodium bisulphite.

In some embodiments, the organic peroxide-ferrous salt system includes tert-butyl hydroperoxide-ferrous sulfate.

In some embodiments, the multi-electron transfer hypervalent compound-sulphite system includes sodium chlorate-sodium sulphite.

In some embodiments, the non-peroxide initiator includes ammonium ceric nitrate-thiourea.

The present disclosure also provides use of the dual-scale toughened cement-based composite material described in the above technical solutions in building materials.

In some embodiments, the use includes the steps of

- mixing the polymer monomer, the initiator, the crosslinking agent, and water to obtain an in-situ polymerization solution;
- mixing the cementitious material and the in-situ polymerization solution to obtain an in-situ polymerization modified cement-based slurry;
- mixing the in-situ polymerization modified cement-based slurry and fibers to obtain a dual-scale toughened cement-based composite slurry; and
- pouring and curing the dual-scale toughened cement-based composite slurry.

In some embodiments, the dual-scale toughened cement-based composite slurry is prepared at a temperature of 0-60° C.

In some embodiments, a mass ratio of the cementitious material to water is in a range of 1:(0.35-0.4).

In some embodiments, mixing the cementitious material and the in-situ polymerization solution is performed by stirring, the stirring including a first stirring and a second stirring, wherein the first stirring is performed at an autorotation rate of 135-145 rpm and a revolution rate of 57-67 rpm for 1-3 min; and the second stirring is performed at an autorotation rate of 275-295 rpm and a revolution rate of 115-135 rpm for 60-120 s.

In some embodiments, mixing the in-situ polymerization modified cement-based slurry and the fibers is performed by stirring, the stirring being performed at an autorotation rate of 135-145 rpm and a revolution rate of 57-67 rpm for 1-5 min.

The present disclosure provides a dual-scale toughened cement-based composite material, comprising a cementitious material, a polymer monomer, an initiator, a crosslinking agent, and fibers; wherein functional groups of the polymer monomer include a carbon-carbon double bond and a carboxyl group; and the fibers include steel fibers and/or synthetic fibers, the synthetic fibers including one or more selected from the group consisting of polyvinyl alcohol fibers, polypropylene fibers, glass fibers, and carbon fibers.

In the present disclosure, the in-situ polymerization of the polymer monomer could overcome some of the drawbacks existing in conventional polymer modification, forming a uniformly distributed polymer network. Further, due to the presence of the carboxyl functional group, there is chemical bonding with hydration products, forming a tightly bonded organic-inorganic network, which is capable of remarkably improving the flexural strength of cement-based materials. The incorporation of fibers could bear load, inhibit cracking, and interweave into a network of fibers, and thereby also improve the flexural strength. Simultaneously with the formation of a polymer network from the in-situ polymerization of the polymer monomer, the fiber surface is thereby modified in situ. The polymer network acts synergistically with the fibers to form a polymer-fiber-matrix network structure, resulting in a cement-based material with high flexural strength through dual-scale modification. Specifically, firstly, polymers and fibers are substances for modification of different scales, and concrete structure is improved from a microscopic scale through the in-situ polymerization of polymer monomer, and improved from a macroscopic scale (millimeter scale) by fibers, which act from two scales to improve the flexural strength of the material. Secondly, the fiber surface could be modified in situ by the in-situ polymerization of the polymer monomer on the fibers, which improves the bonding property and interface structure between the fibers and the matrix, thereby fully exerting the modification potential of the fibers. Finally, the polymer network formed in situ from the polymer monomer and the fiber network formed by the interweaving of the fibers together constitute the structure of the polymer-fiber-cement matrix, thereby stably improving the toughness of the cement-based composite material.

The test results of examples show that the dual-scale toughened cement-based composite material according to the present disclosure has a 7-day flexural strength of 7.2-12.2 MPa and a 28-day flexural strength of 8.3-14.3 MPa, which show an increase by 50-150% compared with the cement-based material without modifying substances (i.e., polymer monomer, fibers), resulting in greatly improved flexural strength and excellent toughness.

DETAILED DESCRIPTION OF THE DISCLOSURE

Figure 1:
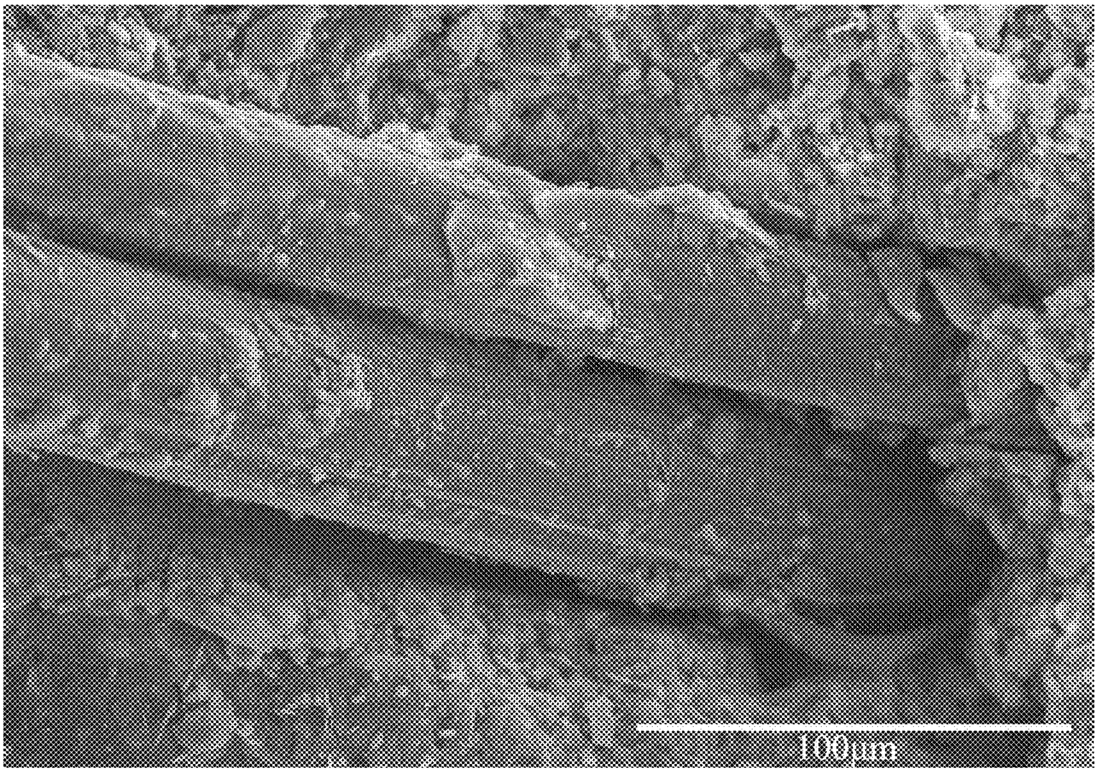
FIG. 1 is a scanning electron microscope (SEM) image of the test specimen obtained in Comparative Example 2.

The present disclosure provides a dual-scale toughened cement-based composite material, comprising a cementitious material, a polymer monomer, an initiator, a crosslinking agent, and fibers;

wherein functional groups of the polymer monomer include a carbon-carbon double bond and a carboxyl group; and the fibers include steel fibers and/or synthetic fibers, the synthetic fibers including one or more selected from the group consisting of polyvinyl alcohol fibers, polypropylene fibers, glass fibers, and carbon fibers.

In the present disclosure, unless otherwise specified, the components are each commercially available goods well known to those skilled in the art.

The dual-scale toughened cement-based composite material according to the present disclosure includes the cementitious material. In some embodiments of the present disclosure, the cementitious material comprises cement. In some embodiments of the present disclosure, the cement is ordinary Portland cement. In some embodiments of the present disclosure, a grade of the ordinary Portland cement is grade 32.5, grade 42.5 or grade 52.5.

In some embodiments of the present disclosure, the dual-scale toughened cement-based composite material further comprises an aggregate and/or an admixture.

In some embodiments of the present disclosure, the aggregate comprises sand and/or gravels. In the present disclosure, there is no particular limitation on sand, and sand well known to those skilled in the art may be used. In the present disclosure, there is no particular limitation on gravels, and gravels well known to those skilled in the art may be used. In some embodiments of the present disclosure, a mass ratio of the cement to the aggregate is in a range of 1:(1-3), and preferably 1:(1.5-2.5).

In some embodiments of the present disclosure, the admixture comprises silica fume and/or fly ash. In some embodiments of the present disclosure, a mass ratio of the admixture to the cement is not larger than 1.

The dual-scale toughened cement-based composite material according to the present disclosure includes the polymer monomer. In the present disclosure, functional groups of the polymer monomer include a carbon-carbon double bond and a carboxyl group. As an alternative technical solution, functional groups of the polymer monomer include a carbon-carbon double bond and a group that is hydrolysable into carboxyl group. In some embodiments of the present disclosure, the polymer monomer includes one or more of acrylamide monomers, acrylic polymer monomers, a butyl methacrylate monomer, an ethylene dimethacrylate monomer, and a hydroxyethyl methacrylate monomer. In some embodiments of the present disclosure, the acrylamide monomers include one or more of acrylamide, hydroxymethyl acrylamide, and N-isopropylacrylamide. In some embodiments of the present disclosure, the acrylic polymer monomers include sodium acrylate.

In some embodiments of the present disclosure, a mass ratio of the cementitious material to the polymer monomer is in a range of 100:(0.1-10), preferably 100:(1-7), and more preferably 100:(3-5).

The dual-scale toughened cement-based composite material according to the present disclosure includes the initiator. In some embodiments of the present disclosure, the initiator includes one or more of persulfate, sulphite, an organic peroxide-ferrous salt system, a multi-electron transfer hypervalent compound-sulphite system, and a non-peroxide initiator. In some embodiments of the present disclosure, the persulfate includes one or more of ammonium persulfate, potassium persulfate, and sodium persulfate. In some embodiments of the present disclosure, the sulphite includes sodium sulphite and/or sodium bisulphite. In some embodiments of the present disclosure, the organic peroxide-ferrous salt system comprises tert-butyl hydroperoxide-ferrous sulfate. In some embodiments of the present disclosure, the multi-electron transfer hypervalent compound-sulphite system includes sodium chlorate-sodium sulphite. In some embodiments of the present disclosure, the non-peroxide initiator includes ammonium ceric nitrate-thiourea.

In some embodiments of the present disclosure, a mass ratio of the polymer monomer to the initiator is in a range of 100:(0.5-5), preferably 100:(0.8-3), and more preferably 100:(1-2).

The dual-scale toughened cement-based composite material according to the present disclosure includes the crosslinking agent. In some embodiments of the present disclosure, the crosslinking agent is a polyamino crosslinking agent. In some embodiments of the present disclosure, the crosslinking agent includes one or more of N,N'-methylenebisacrylamide, hexamethylenetetramine-hydroquinone, polyethyleneimine, p-phenylenediamine, and dimethylaminoethyl methacrylate.

In some embodiments of the present disclosure, a mass ratio of the polymer monomer to the crosslinking agent is in a range of 100:(0.3-5), preferably 100:(0.4-3), and more preferably 100:(0.5-2).

The dual-scale toughened cement-based composite material according to the present disclosure includes the fibers. In the present disclosure, the fibers include steel fibers and/or synthetic fibers, the synthetic fibers including one or more of polyvinyl alcohol fibers, polypropylene fibers, glass fibers, and carbon fibers.

In some embodiments of the present disclosure, the steel fibers each have a diameter of 300-1200 μm. In some embodiments, the steel fibers each have a length of 20-120 mm. In some embodiments of the present disclosure, the synthetic fibers each have a diameter of 5-100 μm. In some embodiments, the synthetic fibers each have a length of 3-40 mm.

In some embodiments of the present disclosure, the fibers account for 0.5-3 vol. %, preferably 1-2.5 vol. %, and more preferably 1.5-2 vol. % of the dual-scale toughened cement-based composite material.

The present disclosure also provides use of the dual-scale toughened cement-based composite material described in the above technical solutions in building materials.

In some embodiments of the present disclosure, the use comprises the steps of mixing the polymer monomer, the initiator, the crosslinking agent, and water to obtain an in-situ polymerization solution;

mixing the cementitious material and the in-situ polymerization solution to obtain an in-situ polymerization modified cement-based slurry;

mixing the in-situ polymerization modified cement-based slurry and the fibers to obtain a dual-scale toughened cement-based composite slurry, and pouring and curing the dual-scale toughened cement-based composite slurry.

In the present disclosure, the polymer monomer, the initiator, the crosslinking agent, and water are mixed to obtain an in-situ polymerization solution.

In some embodiments of the present disclosure, the dual-scale toughened cement-based composite slurry in said use is prepared at a temperature of 0-60° C., and preferably 0-40° C.

In some embodiments of the present disclosure, mixing the polymer monomer, the initiator, the crosslinking agent, and the water is performed by mixing the polymer monomer and the water to obtain a polymer monomer solution, and mixing the polymer monomer solution, the initiator and the crosslinking agent.

In the present disclosure, there is no particular limitation on the means for mixing the polymer monomer, the initiator, the crosslinking agent, and water, and any means well known to those skilled in the art may be used, such as stirring. In some embodiments of the present disclosure, the stirring is performed by magnetic stirring. In some embodiments, the stirring is performed for 5-10 min.

After obtaining the in-situ polymerization solution, the cementitious material and the in-situ polymerization solution are mixed to obtain an in-situ polymerization modified cement-based slurry.

In some embodiments of the present disclosure, a mass ratio of the cementitious material to water is in a range of 1:(0.35-0.4), preferably 1:(0.38-0.4), and more preferably 1:0.4.

In some embodiments of the present disclosure, mixing the cementitious material and the in-situ polymerization solution is performed by stirring. In some embodiments, the stirring comprises a first stirring and a second stirring. In some embodiments of the present disclosure, the first stirring is performed at an autorotation rate of 135-145 rpm. In some embodiments, the first stirring is performed at a revolution rate of 57-67 rpm. In some embodiments, the first stirring is performed for 1-3 min, and preferably 1.5-2.5 min. In some embodiments of the present disclosure, the second stirring is performed at an autorotation rate of 275-295 rpm. In some embodiments, the second stirring is performed at a revolution rate of 115-135 rpm. In some embodiments, the second stirring is performed for 60-120 s, and preferably 90-100 s.

In some embodiments of the present disclosure, the dual-scale toughened cement-based composite material further includes an aggregate and/or an admixture. In some embodiments, the aggregate and/or admixture are used at the same timing with that of the cementitious material.

In the present disclosure, after obtaining the in-situ polymerization modified cement-based slurry, the in-situ polymerization modified cement-based slurry and the fibers are mixed to obtain a dual-scale toughened cement-based composite slurry, and the obtained dual-scale toughened cement-based composite slurry is poured and cured.

In some embodiments of the present disclosure, mixing the in-situ polymerization modified cement-based slurry and the fibers is performed by adding the fibers to the in-situ polymerization modified cement-based slurry. In some embodiments of the present disclosure, mixing the in-situ polymerization modified cement-based slurry and the fibers is performed by stirring. In some embodiments, the stirring is performed at an autorotation rate of 135-145 rpm. In some embodiments, the stirring is performed at a revolution rate of 57-67 rpm. In some embodiments, the stirring is performed for 1-5 min, and preferably 2-3 min. In some embodiments of the present disclosure, the fibers adhered onto the mixing apparatus are scraped into the in-situ polymerization modified cement-based slurry.

In the present disclosure, there is no particular limitation on the pouring, and any pouring well known to those skilled in the art may be adopted. In some specific embodiments of the present disclosure, the dual-scale toughened cement-based composite slurry is subjected to molding, shaking, smoothing, covering with a film and demolding in sequence. In some embodiments of the present disclosure, the shaking is performed 30-90 times, preferably 50-70 times, and more preferably 60 times. In some embodiments of the present disclosure, the covering with a film is performed by using a film of a cling film. In some embodiments of the present disclosure, the covering with a film is performed for 24 h.

In some embodiments of the present disclosure, the curing is performed by a standard curing. In some embodiments, the standard curing is performed at a temperature of 18-22° C. In some embodiments, the standard curing is performed at a the humidity of not lower than 95%.

In order to further illustrate the present disclosure, a dual-scale toughened cement-based composite material according to the present disclosure and its use are described in detail below with reference to the following examples, which are not to be construed as limiting the scope of the present disclosure. Obviously, the described examples are only some but not all of the examples of the present disclosure. Based on the examples in the present disclosure, all other examples, which are obtained by those of ordinary skill in the art without inventive labor, should fall within the scope of the present disclosure.

Example 1

45 g of acrylamide monomer and 600 g of water were stirred, obtaining a polymer monomer solution. The obtained polymer monomer solution, 0.6 g of ammonium persulfate and 0.3 g of N,N'-methylenebisacrylamide were mixed, and magnetically stirred for 5 min, obtaining an in-situ polymerization solution.

1500 g of ordinary Portland cement (P.O grade 42.5) and the in-situ polymerization solution were stirred first at an autorotation rate of 135-145 rpm and a revolution rate of 57-67 rpm for 2 min, and then at an autorotation rate of 275-295 rpm and a revolution rate of 115-135 rpm for 90 s, obtaining an in-situ polymerization modified cement-based slurry.

7.2 g of polyvinyl alcohol fibers (having a diameter of 40 μm and a length of 12 mm) were added to the obtained in-situ polymerization modified cement-based slurry. The resulting mixture was stirred at an autorotation rate of 135-145 rpm, and a revolution rate of 57-67 rpm for 2 min. The fibers adhered onto the mixing apparatus were scraped into the dual-scale toughened cement-based composite slurry. The stirring was continued for another 1 min. The dual-scale toughened cement-based composite slurry was molded, shaken for 60 times, smoothed, covered with a film for 24 h and demolded, and then subjected to standard curing at a temperature of 18-22° C. and a humidity of not lower than 95%.

In this example, the fibers accounted for 0.5 vol. % of the dual-scale toughened cement-based composite material; a mass ratio of the cementitious material (ordinary Portland cement) to the polymer monomer (acrylamide monomer) was 100:3; a mass ratio of the polymer monomer (acrylamide monomer) to the initiator (ammonium persulfate) was 100:1.33; and a mass ratio of the polymer monomer (acrylamide monomer) to the crosslinking agent (N,N'-methylenebisacrylamide) was 100:0.67.

Example 2

Example 2 was performed according to the technical means as described in Example 1, except that 14.4 g of polyvinyl alcohol fibers were used.

In this example, the fibers accounted for 1 vol. % of the dual-scale toughened cement-based composite material; a mass ratio of the cementitious material (ordinary Portland cement) to the polymer monomer (acrylamide monomer)

was 100:3; a mass ratio of the polymer monomer (acrylamide monomer) to the initiator (ammonium persulfate) was 100:1.33; and a mass ratio of the polymer monomer (acrylamide monomer) to the crosslinking agent (N,N'-methylenebisacrylamide) was 100:0.67.

Example 3

Example 3 was performed according to the technical means as described in Example 1, except that 21.6 g of polyvinyl alcohol fibers were used.

In this example, the fibers accounted for 1.5 vol. % of the dual-scale toughened cement-based composite material; a mass ratio of the cementitious material (ordinary Portland cement) to the polymer monomer (acrylamide monomer) was 100:3; a mass ratio of the polymer monomer (acrylamide monomer) to the initiator (ammonium persulfate) was 100:1.33; and a mass ratio of the polymer monomer (acrylamide monomer) to the crosslinking agent (N,N'-methylenebisacrylamide) was 100:0.67.

Example 4

Example 4 was performed according to the technical means as described in Example 1, except that 28.8 g of polyvinyl alcohol fibers were used.

In this example, the fibers accounted for 2 vol. % of the dual-scale toughened cement-based composite material; a mass ratio of the cementitious material (ordinary Portland cement) to the polymer monomer (acrylamide monomer) was 100:3; a mass ratio of the polymer monomer (acrylamide monomer) to the initiator (ammonium persulfate) was 100:1.33, and a mass ratio of the polymer monomer (acrylamide monomer) to the crosslinking agent (N,N'-methylenebisacrylamide) was 100:0.67.

Example 5

Example 5 was performed according to the technical means as described in Example 1, except that 60 g of acrylamide monomer, 1 g of ammonium persulfate, 0.5 g of N,N'-methylenebisacrylamide, and 28.8 g of polyvinyl alcohol fibers were used.

In this example, the fibers accounted for 1.7 vol. % of the toughened cement-based composite material; a mass ratio of the cementitious material (ordinary Portland cement) to the polymer monomer (acrylamide monomer) was 100:4; a mass ratio of the polymer monomer (acrylamide monomer) to the initiator (ammonium persulfate) was 100:1.33; and a mass ratio of the polymer monomer (acrylamide monomer) to the crosslinking agent (N,N'-methylenebisacrylamide) was 100:0.67.

Example 6

Example 6 was performed according to the technical means as described in Example 2, except that 0.225 g of ammonium persulfate was used.

In this example, the fibers accounted for 1 vol. % of the dual-scale toughened cement-based composite material; a mass ratio of the cementitious material (ordinary Portland cement) to the polymer monomer (acrylamide monomer) was 100:3; a mass ratio of the polymer monomer to the crosslinking agent was 100:0.5; a mass ratio of the polymer monomer (acrylamide monomer) to the initiator (ammonium persulfate) was 100:0.5; and a mass ratio of the polymer monomer (acrylamide monomer) to the crosslinking agent (N,N'-methylenebisacrylamide) was 100:0.67.

Example 7

Example 7 was performed according to the technical means as described in Example 2, except that 0.45 g of ammonium persulfate was used.

In this example, the fibers accounted for 1 vol. % of the dual-scale toughened cement-based composite material; a mass ratio of the cementitious material (ordinary Portland cement) to the polymer monomer (acrylamide monomer) was 100:3; a mass ratio of the polymer monomer to the crosslinking agent was 100:1; a mass ratio of the polymer monomer (acrylamide monomer) to the initiator (ammonium persulfate) was 100:1; and a mass ratio of the polymer monomer (acrylamide monomer) to the crosslinking agent (N,N'-methylenebisacrylamide) was 100:0.67.

Example 8

Example 8 was performed according to the technical means as described in Example 2, except that 0.675 g of ammonium persulfate was used.

In this example, the fibers accounted for 1 vol. % of the dual-scale toughened cement-based composite material; a mass ratio of the cementitious material (ordinary Portland cement) to the polymer monomer (acrylamide monomer) was 100:3; a mass ratio of the polymer monomer to the crosslinking agent was 100:1.5; a mass ratio of the polymer monomer (acrylamide monomer) to the initiator (ammonium persulfate) was 100:1.5; a mass ratio of the polymer monomer (acrylamide monomer) to the crosslinking agent (N,N'-methylenebisacrylamide) was 100:0.67.

Example 9

Example 9 was performed according to the technical means as described in Example 2, except that 0.9 g of ammonium persulfate was used.

In this example, the fibers accounted for 1 vol. % of the dual-scale toughened cement-based composite material; a mass ratio of the cementitious material (ordinary Portland cement) to the polymer monomer (acrylamide monomer) was 100:3; a mass ratio of the polymer monomer to the crosslinking agent was 100:2; a mass ratio of the polymer monomer (acrylamide monomer) to the initiator (ammonium persulfate) was 100:2; a mass ratio of the polymer monomer (acrylamide monomer) to the crosslinking agent (N,N'-methylenebisacrylamide) was 100:0.67.

Example 10

Example 10 was performed according to the technical means as described in Example 2, except that the polyvinyl alcohol fibers have a diameter of 15 μm.

In this example, the fibers accounted for 1 vol. % of the dual-scale toughened cement-based composite material; a mass ratio of the cementitious material (ordinary Portland cement) to the polymer monomer (acrylamide monomer) was 100:3; a mass ratio of the polymer monomer (acrylamide monomer) to the initiator (ammonium persulfate) was 100:1.33; and a mass ratio of the polymer monomer (acrylamide monomer) to the crosslinking agent (N,N'-methylenebisacrylamide) was 100:0.67.

Example 11

Example 11 was performed according to the technical means as described in Example 2, except that hydroxymethyl acrylamide monomer was used to substitute acrylamide monomer in Example 2.

Comparative Example 1

1500 g of ordinary Portland Cement (P.O grade 42.5) was added into a mixing pot, and stirred in a mortar mixer at an autorotation rate of 135-145 rpm and a revolution rate of 57-67 rpm for 2 min. 600 g of water was added thereto, and the resulting mixture was stirred at an autorotation rate of 135-145 rpm and a revolution rate of 57-67 rpm for 2 min, and then stirred at an autorotation rate of 275-295 rpm and a revolution rate of 115-135 rpm for 90 s. The resulting slurry was then molded, shaken 60 times, smoothed, covered with a film for 24 h, and demolded, and then subjected to standard curing at a temperature of 18-22° C., and a humidity of not lower than 95%.

In this comparative example, no polymer monomers, initiators, crosslinking agents and fibers were used.

Comparative Example 2

1500 g of ordinary Portland cement (P.O grade 42.5) and 600 g of water were stirred at an autorotation rate of 135-145 rpm and a revolution rate of 57-67 rpm for 2 min, and then stirred at an autorotation rate of 275-295 rpm and a revolution rate of 115-135 rpm for 90 s, obtaining a cement-based slurry.

28.8 g of polyvinyl alcohol fibers (having a diameter of 40 μm and a length of 12 mm) were added to the cement-based slurry, and the resulting slurry was stirred at an autorotation rate of 135-145 rpm and a revolution rate of 57-67 rpm for 2 min. The fibers adhered onto the mixing device were scraped into the dual-scale toughened cement-based composite slurry. The stirring was continued for another 1 min. The resulting slurry was molded, shaken 60 times, smoothed, covered with a film for 24 h, and demolded, and then subjected to standard curing at a temperature of 18-22° C. and a humidity of not lower than 95%.

In this comparative example, no polymer monomers, initiators and crosslinking agents were used, and the fibers accounted for 2 vol. % of the cement-based composite material.

Comparative Example 3

45 g of acrylamide monomer and 600 g of water were stirred, obtaining a polymer monomer solution. The obtained polymer monomer solution, 0.6 g of ammonium persulfate, and 0.3 g of N,N'-methylenebisacrylamide were mixed and magnetically stirred for 5 min, obtaining an in-situ polymerization solution.

1500 g of ordinary Portland cement (P.O grade 42.5) and the in-situ polymerization solution were stirred at an autorotation rate of 135-145 rpm and a revolution rate of 57-67 rpm for 2 min, then stirred at an autorotation rate of 275-295 rpm and a revolution rate of 115-135 rpm for 90 s. The resulting slurry was molded, shaken 60 times, smoothed, covered with a film for 24 h, and demolded, and subjected to standard curing at a temperature of 18-22° C., and a humidity of not lower than 95%.

In this comparative example, no fibers were used, and a mass ratio of the cementitious material (ordinary Portland cement) to the polymer monomer was 100:3; a mass ratio of the polymer monomer (acrylamide monomer) to the initiator (ammonium persulfate) was 100:1.33; and a mass ratio of the polymer monomer (acrylamide monomer) to the crosslinking agent (N,N'-methylenebisacrylamide) was 100:0.67.

Comparative Example 4

1500 g of ordinary Portland cement (P.O grade 42.5) and 600 g of water were stirred at an autorotation rate of 135-145 rpm and a revolution rate of 57-67 rpm for 2 min, and then stirred at an autorotation rate of 275-295 rpm and a revolution rate of 115-135 rpm for 90 s, obtaining a cement-based slurry.

14.4 g of polyvinyl alcohol fibers (having a diameter of 40 μm and a length of 12 mm) were added to the cement-based slurry. The resulting slurry was stirred at an autorotation rate of 135-145 rpm and a revolution rate of 57-67 rpm for 2 min. The fibers adhered onto the mixing device were scraped into the dual-scale toughened cement-based composite slurry. The stirring was continued for another 1 min. The resulting mixture was molded, shaken 60 times, smoothed, covered with a film for 24 h, and demolded, and then subjected to standard curing at a temperature of 18-22° C., and a humidity of not lower than 95%.

In this comparative example, no polymer monomers, initiators and crosslinking agents were used; and the fibers accounted for 1 vol. % of the cement-based composite material.

Comparative Example 5

45 g of polyacrylamide, 600 g of water and 1500 g of ordinary Portland cement were stirred at an autorotation rate of 135-145 rpm and a revolution rate of 57-67 rpm for 2 min, and then at an autorotation rate of 275-295 rpm and a revolution rate of 115-135 rpm for 90 s, obtaining a polymer-modified slurry.

14.4 g of polyvinyl alcohol fibers (having a diameter of 40 μm and a length of 12 mm) were added to the polymer modified slurry. The resulting slurry was stirred at autorotation rate of 135-145 rpm, and a revolution rate of 57-67 rpm for 2 min. The fibers adhered onto the stirring device were scraped into the resulting toughened cement-based composite slurry. The stirring was continued for another 1 min. The toughened cement-based composite slurry was molded, shaken 60 times, smoothed and covered with a film for 24 h, and demolded, and then subjected to standard curing at a temperature of 18-22° C. and a humidity of not lower than 95%.

In this comparative example, the fibers accounted for 1 vol. % of the dual-scale toughened cement-based composite material; a mass ratio of the cementitious material (ordinary Portland cement) to the polymer (polyacrylamide) was 100:3; the polymer was polyacrylamide rather than one obtained from the in-situ polymerization of the monomer.

Comparative Example 6

45 g of acrylamide monomer and 600 g of water were stirred, obtaining a polymer monomer solution. The polymer monomer solution, 0.6 g of ammonium persulfate and 0.3 g of N,N'-methylenebisacrylamide were mixed and magnetically stirred for 5 min, obtaining an in-situ polymerization solution.

1500 g of ordinary Portland cement (P.O grade 42.5) and 14.4 g of polyvinyl alcohol fibers (having a diameter of 40

μm and a length of 12 mm) were stirred at an autorotation rate of 135-145 rpm and a revolution rate of 57-67 rpm for 3 min, obtaining a cement-based material-fibers dry material. The cement-based material-fibers dry material and the in-situ polymerization solution were stirred at an autorotation rate of 135-145 rpm and a revolution rate of 57-67 rpm for 2 min, and then at an autorotation rate of 275-295 rpm and a revolution rate of 115-135 rpm for 90 s, obtaining the dual-scale toughened cement-based composite slurry. The fibers adhered onto the stirring device were scraped into the dual-scale toughened cement-based composite slurry. The stirring was continued for another 1 min. The dual-scale toughened cement-based composite slurry was molded, shaken 60 times, smoothed, covered with a film for 24 h, and demolded, and then subjected to standard curing at a temperature of 18-22° C. and a humidity of not lower than 95%.

In this comparative example, the fibers accounted for 1 vol. % of the dual-scale toughened cement-based composite material; a mass ratio of the cementitious material (ordinary Portland cement) to the polymer monomer (acrylamide monomer) was 100:3; the cementitious material and the fibers were mixed first, and the resulting cement-based material-fibers dry material and the in-situ polymerization solution were mixed.

Comparative Example 7

Comparative Example 7 was performed according to the technical means as described in Example 2, except that 144 μL of tetramethylethylenediamine instead of 0.3 g of N,N'-methylenebisacrylamide was used.

In this comparative example, the fibers accounted for 1 vol. % of the toughened cement-based composite material; a mass ratio of the cementitious material (ordinary Portland cement) to the polymer monomer (acrylamide monomer) was 100:3; a mass ratio of the polymer monomer (acrylamide monomer) to the initiator (ammonium persulfate) was 100:1.33; and a mass ratio of the polymer monomer (acrylamide monomer) to the crosslinking agent (tetramethylethylenediamine) was 100:0.248.

Comparative Example 8

Comparative Example 8 was performed according to the technical means as described in Example 3, except that: 1.225 g of ammonium persulfate and 1.225 g of sodium sulphite were used as initiators instead of the ammonium persulfate mono-initiation system; and the crosslinking agent N,N'-methylenebisacrylamide was used in an amount of 0.045.

In this comparative example, the fibers accounted for 1.5 vol. % of the toughened cement-based composite material; a mass ratio of the cementitious material (ordinary Portland cement) to the polymer monomer (acrylamide monomer) was 100:3; a mass ratio of the polymer monomer (acrylamide monomer) to the initiator (ammonium persulfate) was 100:2.5; a mass ratio of the polymer monomer (acrylamide monomer) to the initiator (sodium sulphite) was 100:2.5; a mass ratio of the polymer monomer (acrylamide monomer) to the crosslinking agent (N,N'-methylenebisacrylamide) was 100:0.1.

The test specimens of Examples 1 to 11 and Comparative Examples 1 to 7 were subjected to flexural strength test according to GB/T 17671-1999 "Method of testing cements-Determination of strength" (ISO method). The test results are shown in Table 1.

TABLE 1

Results of flexural strength test performed on test specimens of Example 1-11 and Comparative Examples 1-7 (MPa)

| | 7 days | 28 days |
|---|---|---|
| Example 1 | 7.2 | 8.3 |
| Example 2 | 8.4 | 10.3 |
| Example 3 | 9.4 | 11.1 |
| Example 4 | 12.2 | 14.3 |
| Example 5 | 10.7 | 12.4 |
| Example 6 | 7.2 | 8.4 |
| Example 7 | 8.8 | 10.2 |
| Example 8 | 9.8 | 11.6 |
| Example 9 | 9.2 | 10.7 |
| Example 10 | 7.4 | 8.7 |
| Example 11 | 8.9 | 10.8 |
| Comparative Example 1 | 4.8 | 5.6 |
| Comparative Example 2 | 7.1 | 8 |
| Comparative Example 3 | 7.5 | 8.5 |
| Comparative Example 4 | 5.6 | 6.8 |
| Comparative Example 5 | 6.6 | 7.5 |
| Comparative Example 6 | 7.7 | 8.6 |
| Comparative Example 7 | 6.8 | 7.9 |
| Comparative Example 8 | 7.3 | 8.4 |

As can be seen from Table 1, the dual-scale toughened cement-based composite material according to the present disclosure has 7-day flexural strength of 7.2-12.2 MPa and 28-day flexural strength of 8.3-14.3 MPa, which shows an increase by 50-150% compared with the cement-based material without modifying substances (i.e., Comparative Example 1). That is to say, the flexural strength is greatly improved, and the toughness is excellent.

SEM was performed on the test specimens obtained in Example 4 and Comparative Example 2. The SEM images obtained are shown in FIGS. 1 to 6, wherein FIG. 1 is the SEM image of the test specimen obtained in Comparative Example 2, FIGS. 2 and 3 are the SEM images of the test specimen obtained in Example 4, and FIGS. 4 to 6 are the SEM images of the test specimen obtained in Example 4 after soaking in 1 wt. % hydrochloric acid for 60 s.

As can be seen from FIG. 1, when 2% polyvinyl alcohol fibers are used alone for modification, the fiber surface is relatively smooth with little hydration products attached.

Figure 2:
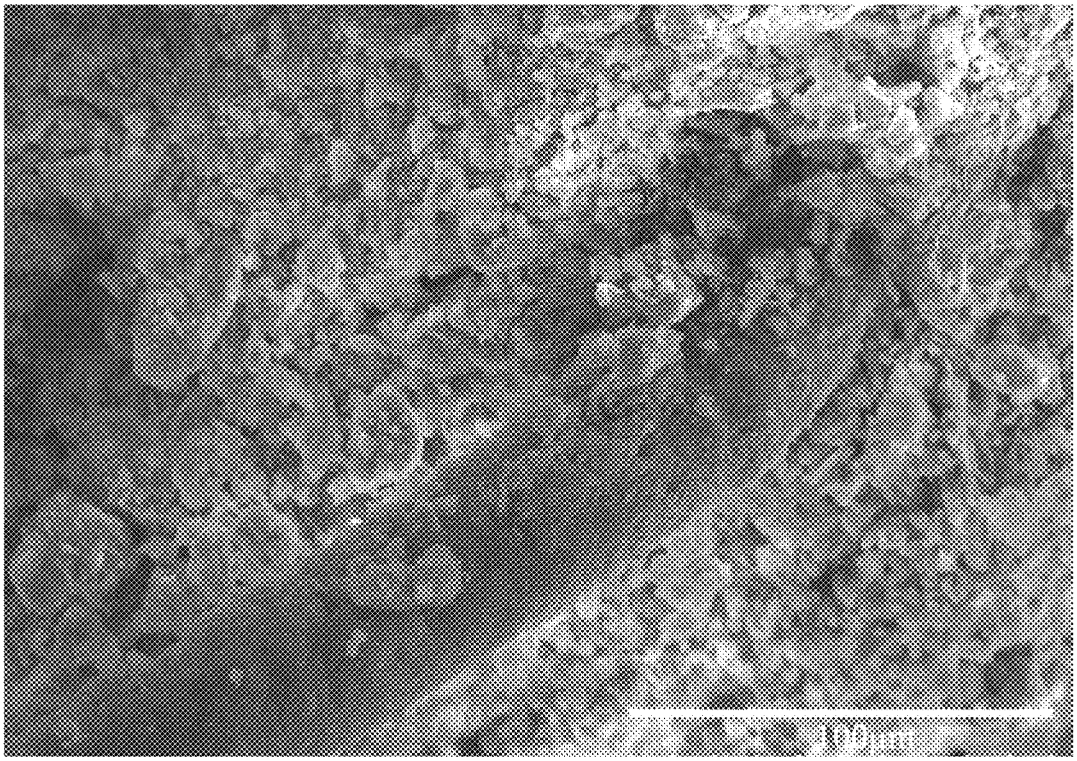
FIG. 2 is an SEM image of the test specimen obtained in Example 4.
Figure 3:
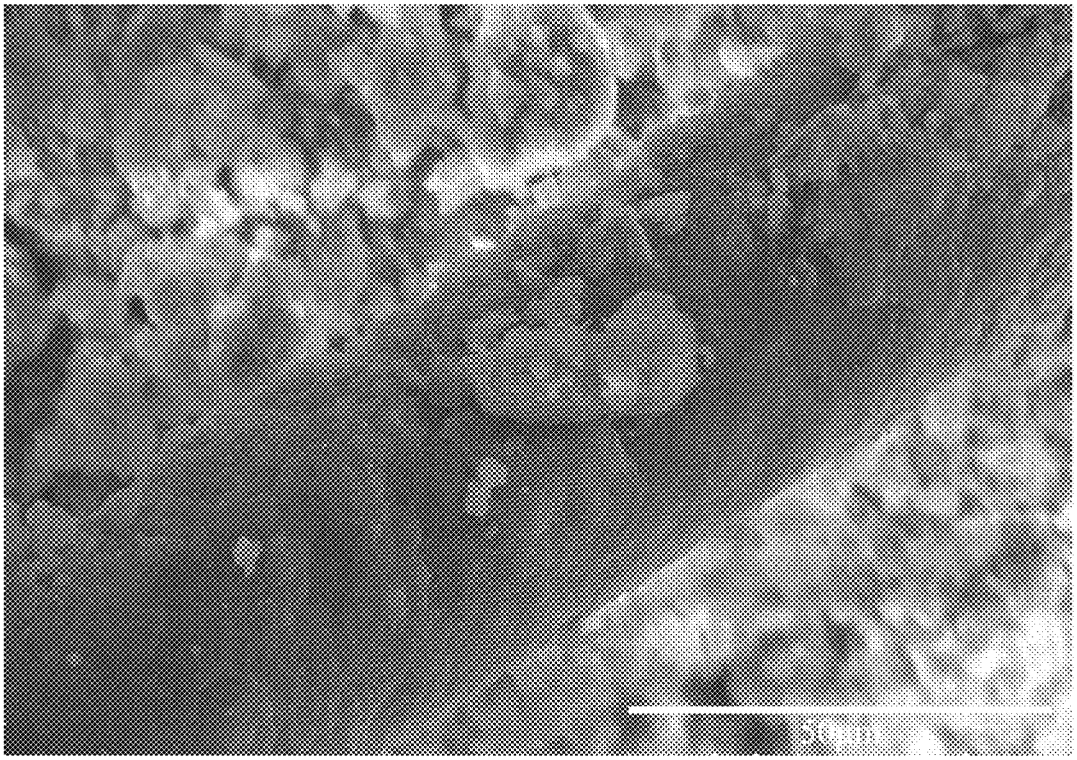
FIG. 3 is an SEM image of the test specimen obtained in Example 4.

As can be seen from FIGS. 2 and 3, the polymer obtained from the in-situ polymerization of acrylamide and the hydration product covers the fiber surface, which increases the bonding properties and interfacial strength between the fibers and the cement matrix. The in-situ polymerization and fibers act together and thus extremely improve the properties of the dual-scale toughened cement-based composite material, particularly the flexural strength.

Figure 4:
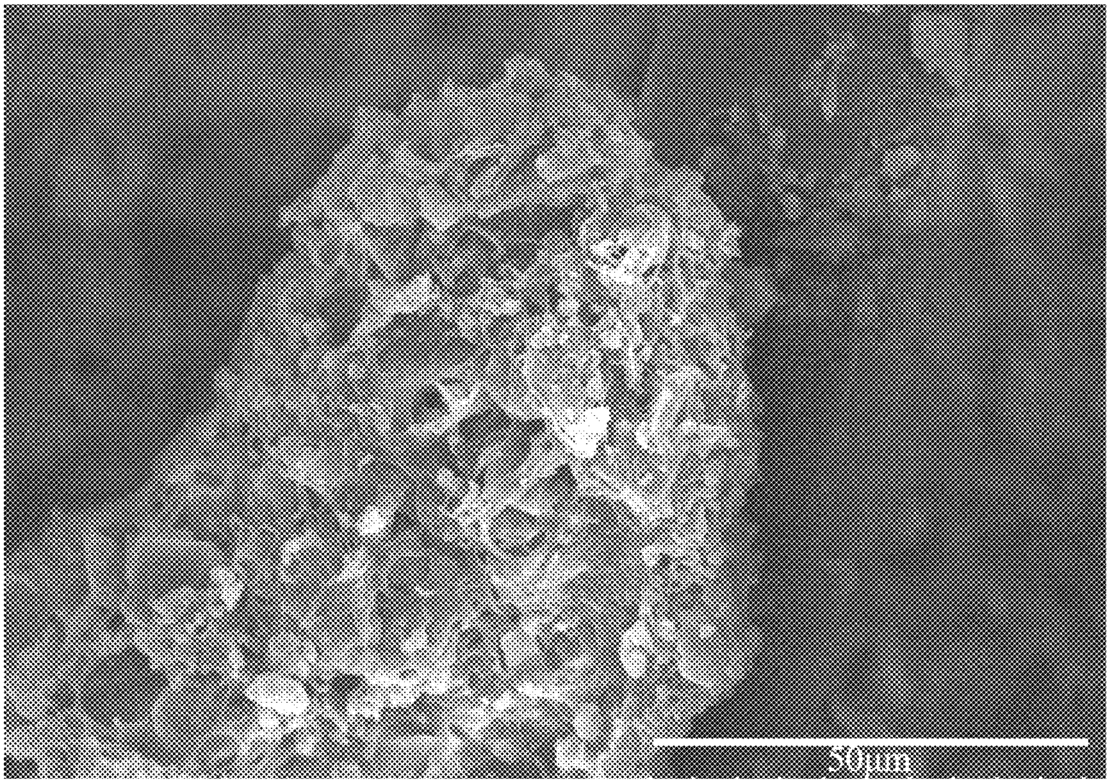
FIG. 4 is an SEM image of the test specimen obtained in Example 4 after soaking in 1 wt. % hydrochloric acid for 60 s.
Figure 5:
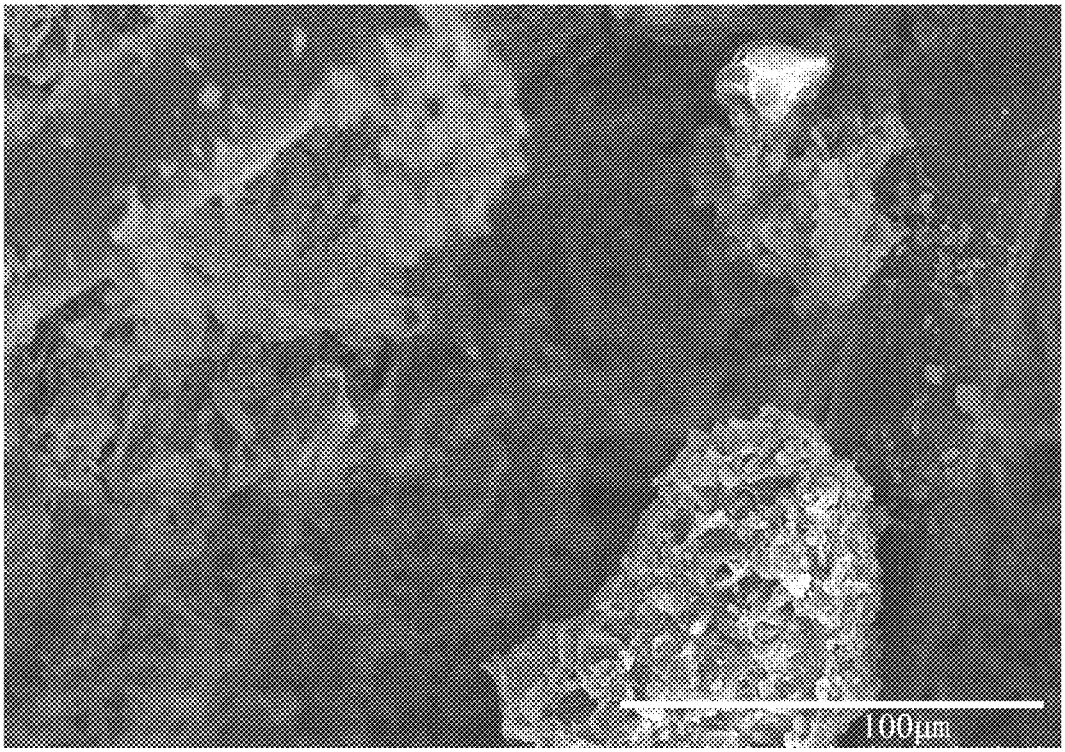
FIG. 5 is an SEM image of the test specimen obtained in Example 4 after soaking in 1 wt. % hydrochloric acid for 60 s.
Figure 6:
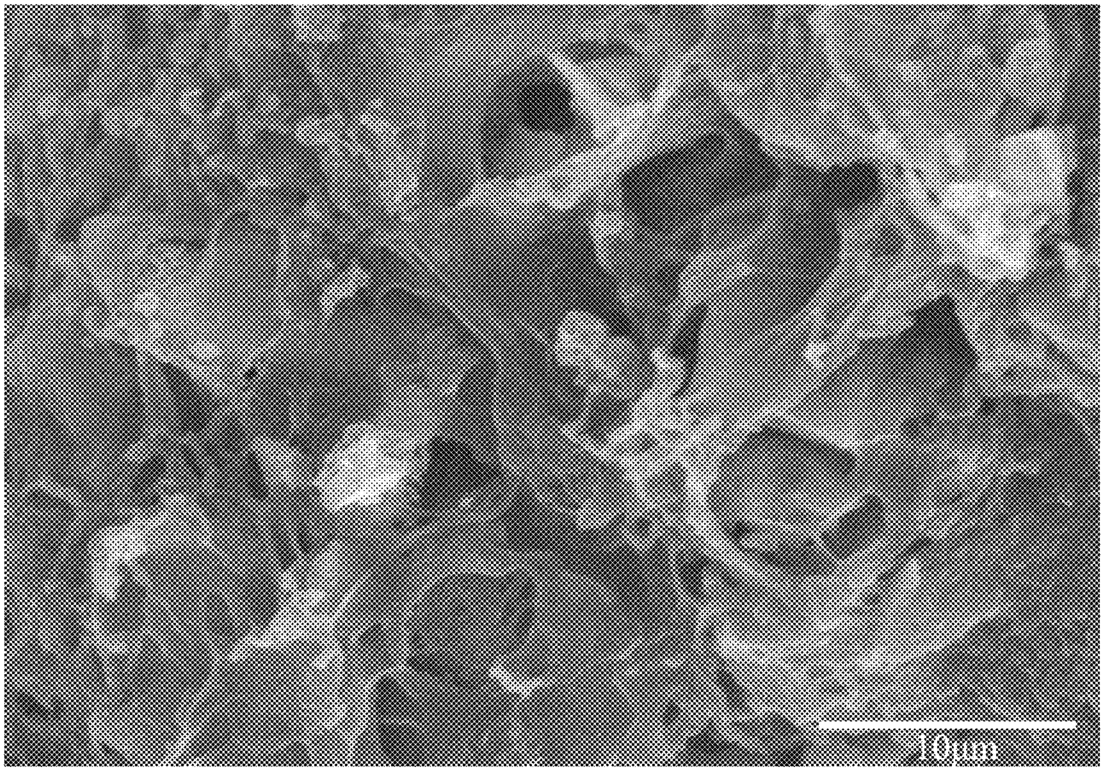
FIG. 6 is an SEM image of the test specimen obtained in Example 4 after soaking in 1 wt. % hydrochloric acid for 60 s.

As can be seen from FIGS. 4-6, the polymer produced by the in-situ polymerization is attached to the fiber surface and the polymer network produced through the in-situ polymerization can be clearly observed.

While the foregoing are merely preferred embodiments of the present disclosure, it should be noted that numerous modifications and variations can be made by those skilled in the art without departing from the principles of the present disclosure. These modifications and variations should be considered to be within the scope of the present disclosure.

What is claimed is:

1. A dual-scale toughened cement-based composite material, comprising a cementitious material, a monomer, an initiator, a crosslinking agent, and fibers;

wherein the monomer is an acrylamide monomer;

the fibers comprise synthetic fibers, the synthetic fibers comprising one or more selected from the group consisting of polyvinyl alcohol fibers, polypropylene fibers, glass fibers, and carbon fibers, and the synthetic fibers each having a diameter of 40-100 μm and a length of 3-40 mm; and a mass ratio of the monomer to the crosslinking agent is in a range of 100:(0.67-5).

2. The dual-scale toughened cement-based composite material as claimed in claim 1, wherein a mass ratio of the cementitious material to the monomer is in a range of 100:(0.1-10), and the fibers account for 0.5-3 vol. % of the dual-scale toughened cement-based composite material.

3. The dual-scale toughened cement-based composite material as claimed in claim 1, wherein the initiator comprises one or more selected from the group consisting of persulfate, sulphite, an organic peroxide-ferrous salt system, a multi-electron transfer hypervalent compound-sulphite system, and a non-peroxide initiator; and a mass ratio of the monomer to the initiator is in a range of 100:(0.5-5).

4. The dual-scale toughened cement-based composite material as claimed in claim 3, wherein the persulfate comprises one or more selected from the group consisting of ammonium persulfate, potassium persulfate, and sodium persulfate.

5. The dual-scale toughened cement-based composite material as claimed in claim 3, wherein the sulphite comprises sodium sulphite and/or sodium bisulphite.

6. The dual-scale toughened cement-based composite material as claimed in claim 3, wherein the organic peroxide-ferrous salt system comprises tert-butyl hydroperoxide-ferrous sulfate.

7. The dual-scale toughened cement-based composite material as claimed in claim 3, wherein the multi-electron transfer hypervalent compound-sulphite system comprises sodium chlorate-sodium sulphite.

8. The dual-scale toughened cement-based composite material as claimed in claim 3, wherein the non-peroxide initiator comprises ammonium ceric nitrate-thiourea.

9. The dual-scale toughened cement-based composite material as claimed in claim 1, wherein the crosslinking agent is a polyamino crosslinking agent.

10. The dual-scale toughened cement-based composite material as claimed in claim 9, wherein the crosslinking agent comprises one or more selected from the group consisting of N,N'-methylenebisacrylamide, hexamethylenetetramine-hydroquinone, polyethyleneimine, p-phenylenediamine, and dimethylaminoethyl methacrylate.

11. The dual-scale toughened cement-based composite material as claimed in claim 1, wherein the cementitious material comprises cement.

12. The dual-scale toughened cement-based composite material as claimed in claim 1, further comprising an aggregate and/or an admixture.

13. The dual-scale toughened cement-based composite material as claimed in claim 12, wherein the aggregate comprises sand and/or gravels.

14. The dual-scale toughened cement-based composite material as claimed in claim 12, wherein the cementitious material comprises cement, and a mass ratio of the cement to the aggregate is in a range of 1:(1-3).

15. The dual-scale toughened cement-based composite material as claimed in claim 12, wherein the admixture comprises silica fume and/or fly ash.

16. The dual-scale toughened cement-based composite material as claimed in claim 12, wherein the cementitious material comprises cement, and a mass ratio of the admixture to the cement is not larger than 1.

17. A dual-scale toughened cement-based composite material, comprising:

a cementitious material, a monomer, an initiator, a crosslinking agent, and fibers;

wherein the monomer is an acrylamide monomer;

the fibers comprise steel fibers or a mixture of steel fibers and synthetic fibers, the synthetic fibers comprising one or more selected from the group consisting of polyvinyl alcohol fibers, polypropylene fibers, glass fibers, and carbon fibers, and the steel fibers each having a diameter of 300-1200 μm and a length of 20-120 mm and the synthetic fibers each having a diameter of 40-100 μm and a length of 3-40 mm; and a mass ratio of the monomer to the crosslinking agent is in a range of 100:(0.67-5).

* * * * *